(12) United States Patent
Xie

(10) Patent No.: US 6,979,510 B2
(45) Date of Patent: Dec. 27, 2005

(54) SOLID POLYMER ELECTROLYTE MEMBRANE OF A FUEL CELL AND METHOD FOR PRODUCING THE SAME

(75) Inventor: Gang Xie, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 410 days.

(21) Appl. No.: 10/025,756

(22) Filed: Dec. 26, 2001

(65) Prior Publication Data

US 2002/0127450 A1 Sep. 12, 2002

(30) Foreign Application Priority Data

Dec. 26, 2000  (JP) ....................... 2000-396059

(51) Int. Cl.[7] ............... H01M 8/10; C08J 5/22
(52) U.S. Cl. .............. 429/30; 429/33; 429/306; 429/13; 429/304; 521/27

(58) Field of Search .............. 429/30, 33, 306, 429/13, 304; 521/27

(56) References Cited

U.S. PATENT DOCUMENTS 5,994,426 A * 11/1999 Nezu et al. .................. 522/125

FOREIGN PATENT DOCUMENTS

| JP | 07-050170 | | 2/1995 | |
|----|-----------|---|--------|----------|
| JP | 07050170 A | * | 2/1995 | ............ H01M/8/02 |
| JP | 09-102322 | | 4/1997 | |

* cited by examiner

Primary Examiner—Patrick Ryan
Assistant Examiner—Angela J. Martin
(74) Attorney, Agent, or Firm—Oblon, Spivak, McClelland, Maier & Neustadt, P.C.

(57) ABSTRACT

In a solid polymer electrolyte membrane with an ion exchangeability employed in a solid polymer electrolyte fuel cell, an anion group is partially combined with the solid polymer membrane.

12 Claims, 4 Drawing Sheets

↓ gamma ray

↓

↓

↓

↓

↓ gamma ray

SOLID POLYMER ELECTROLYTE MEMBRANE OF A FUEL CELL AND METHOD FOR PRODUCING THE SAME

This application is based on and claims priority under 35 U.S.C. § 119 with respect to Japanese Patent Application No. 2000-396059 filed on Dec. 26, 2000, the entire contents of which is incorporated herein by reference.

BACKGROUND OF THE INVENTION

1. Field of the Invention

This invention relates to a solid polymer electrolyte membrane of a fuel cell and a method for producing the solid polymer electrolyte membrane.

2. Description of the Background

To cope with environmental and resources issues, for example carbon monoxide ($CO_2$) emissions, exhaustion of oil resources and so on, solid electrolyte membrane fuel cells have been widely examined. Solid electrolyte membrane fuel cells have high energy density and do not need long charging times. Thus, solid electrode membrane fuel cells have been rapidly developed all over the world.

Generally, solid polymer electrolyte membrane fuel cells include a proton-conductive solid polymer electrolyte membrane. The solid polymer electrolyte membrane fuel cells are apparatuses for generating electromotive forces or inducing electric currents by electrochemical reactions between fuel gas (for example $H_2$ gas) and oxidizer gas.

A solid polymer electrolyte membrane fuel cell produces the following electrochemical reaction using $H_2$ gas as the fuel gas and using $O_2$ gas as oxidizer gas. The solid polymer electrolyte membrane fuel cell produces the next reaction at an anode electrode side.

$$2H_2 \rightarrow 4H^+ + 4e^- \quad (1)$$

After the electrochemical reaction, the resulting proton ($H^+$) passes through the solid polymer electrolyte membrane within the solid polymer electrolyte membrane fuel cell. Then the solid polymer electrolyte membrane fuel cell produces the next reaction at a cathode electrode.

$$4H^+ + O_2 + 4e^- \rightarrow 2H_2O \quad (2)$$

Accordingly, the electrolyte fuel cell produces the electromotive force between the anode and cathode electrodes.

In practical application of the fuel cells, several problems remain to be overcome. Conventional electrolyte membranes are mainly formed by perfluoro carbon sulfonic acid resin. Since electrolyte membranes made of perfluoro carbon sulfonic acid resin are expensive, the cost of these electrolyte membranes is high.

To reduce manufacturing costs, various solid electrolyte membranes employing polyethylene, ethylene tetrafluoroethylene ETFE and so on have been devised. The above solid electrolyte membranes are polymerized with anion groups, for example, sulfonic acid groups, by means of radiation graft polymerization. For example, a conventional solid electrolyte membrane for a fuel cell (ion exchanging membrane) is disclosed in Japanese Patent Application Publication published on Feb. 21, 1995 as Toku-Kai-Hei 07-050170. The solid electrolyte membrane is a polyolefin resin membrane polymerized with sulfonic acid groups. Another conventional solid electrolyte membrane for a fuel cell is disclosed in Japanese Patent Application Publication published on Apr. 15, 1997 as Toku-Kai-Hei 09-102322. This solid electrolyte membrane for the fuel cell is made of a main chain structure formed by a copolymer wherein perfluoro vinyl monomers are polymerized with hydrocarbon vinyl monomers and a hydrocarbon sub chain structure including sulfonic acid groups.

The above conventional solid electrolyte membranes have several problems as follows. Through the radiation graft polymerization, the main chains are cut to be shortened by radiation beams, and crystallization degrees of the substrates are decreased because of grafting in the main chain of the polymers orderly arranged in the polymer substrate. Furthermore, cross-linking between the side chains in the graft polymerization hardens the grafted portion. The substrates drastically decrease the mechanical strength. On the other hand, the substrates include more sulfonic acid groups as hydrophilic groups, thus the percentage of water content of the solid electrolyte membranes is increased. Because of the above moisture content, the solid electrolyte membranes can be widely changed in dimension, thus the solid electrolyte membranes may be broken.

SUMMARY OF THE INVENTION

A solid polymer electrolyte membrane with an ion exchangeability employed in a solid polymer electrolyte fuel cell is characterized in that an anion group is partially introduced into the solid polymer membrane.

A method for producing a solid electrolyte membrane with ion exchangeability employed in a solid polymer electrolyte fuel cell comprises the step of partially combining the anion group with the solid polymer electrolyte membrane.

A method for producing a solid polymer electrolyte membrane includes the following steps. At a first step, a predetermined portion on a surface of a polymer substrate is covered with a first mask to shield the predetermined portion from radiation. At a second step, radiation is applied to the entire polymer substrate. At a third step, a styrene is grafted onto a polymer in the remaining portion of the polymer substrate not covered by the first mask. At a fourth step, the first mask is removed from the polymer substrate. At a fifth step, an anion group is combined with the styrene on the polymer in the grafted remaining portion in the polymer substrate.

Another method for producing a solid polymer electrolyte membrane includes the following steps. At a first step, radiation is applied to a surface of a polymer substrate. At a second step, a predetermined portion in the radiated surface of the polymer substrate is covered with a second mask to shield the predetermined portion from grafting. At a third step, a styrene is grafted onto a polymer in the remaining portion in the polymer substrate not covered with the second mask. At a fourth step, an anion group is combined with the styrene on the polymer in the grafted remaining portion in the polymer substrate.

Another method for producing a solid polymer electrolyte membrane includes the following steps. At a first step, radiation is applied to a surface of the polymer substrate. At a second step, a predetermined portion in the radiated surface of the polymer substrate is covered with the second mask for shielding the predetermined portion from grafting. At a third step, a styrene is grafted onto a polymer in the remaining portion in the polymer substrate not covered with the second mask. At a fourth step, the second mask is removed from the polymer substrate. At a fifth step, an anion group is combined with the styrene on the polymer of a surface portion of the predetermined portion in the thickness direction thereof.

In the aforementioned method for producing the solid polymer electrolyte membrane, the anion group includes a sulfonic acid group.

BRIEF DESCRIPTION OF THE DRAWINGS

The foregoing and additional features and characteristics of the present invention will become more apparent from the following detailed description considered with reference to accompanying drawings in which like reference numerals designate like elements and wherein.

DETAILED DESCRIPTION OF THE INVENTION

The solid polymer electrolyte membrane of the present invention is manufactured by combining anion groups with a membranous polymer substrate by means of radiation graft polymerization. The resulting solid polymer electrolyte membrane has a mechanical strength and dimensional change rate comparable to those of the polymer substrate before graft polymerization.

The polymer substrates are formed by polyolefins, for example polyethylene PE, polypropylene and so on, or polyolefine halides, for example poly-ethylene-tetrafluoroethylene, poly-tetrafluoroethylene-hexafluoropropylene, polyvinylidene fluoride and so on. A polyolefine halide including fluorochemical vinyl monomer carbide-hydrocarbon vinyl monomer copolymer is preferably employed as the polymer substrate.

Thickness of the polymer substrate is not particularly limited, but a thickness of between 10 and 150 $\mu$m is suitable. If the thickness of the polymer substrate is less than 10 $\mu$m, the polymer substrate may be easily damaged. To the contrary, if the thickness of the membranous polymer substrate is more than 150 $\mu$m, the ionic conductive resistance of the polymer substrate becomes high or large, and the conductivity of the substrate is decreased.

The present invention provides a solid polymer electrolyte membrane manufactured by combining the anion groups with a predetermined part of the polymer substrate and a method for producing the solid polymer electrolyte membrane.

Profiles and sizes of the predetermined parts to be combined with the anion groups are not particularly limited. If the remaining portions not combined with the anion groups are integrally formed in the solid polymer electrolyte membrane, the solid polymer electrolyte membrane has a high mechanical strength comparable to that of the polymer substrate.

Though the ways of chemically combining the anion groups with the polymer substrate are not particularly limited, radiation graft polymerization employing an electric beam, X rays, gamma rays and so on is preferable. The sulfonic acid groups, which are categorized in the anion groups, can be combined with the radiated polymer substrate (in other words, the radiated polymer substrate can be sulfonated) by being contacted with a styrene sulfonic acid, an ethylene sulfonic acid and so on. In addition, the polymer substrate may be sulfonated after a styrene is grafted onto the polymer in the polymer substrate.

By the above method of the present invention, the anion groups are combined with the predetermined part of the polymer substrate but not combined with the remaining part. Thus, the resulting solid electrolyte membrane having approximately the same mechanical strength as the polymer substrate is obtained.

EXAMPLE 1

Figure 1:
FIGS. 1(a) to (g) show the steps of manufacturing the solid polymer electrolyte membrane of Example 1.
Figure 1:
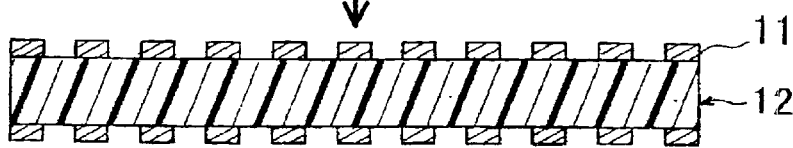
Figure 1:
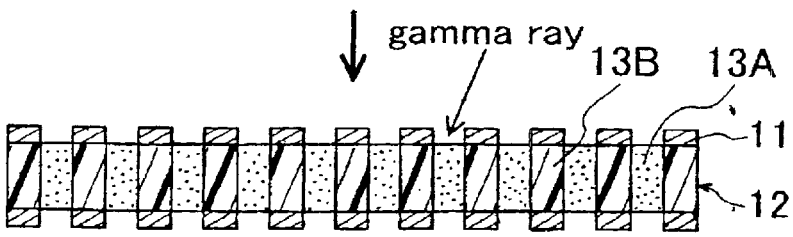
Figure 1:
Figure 1:
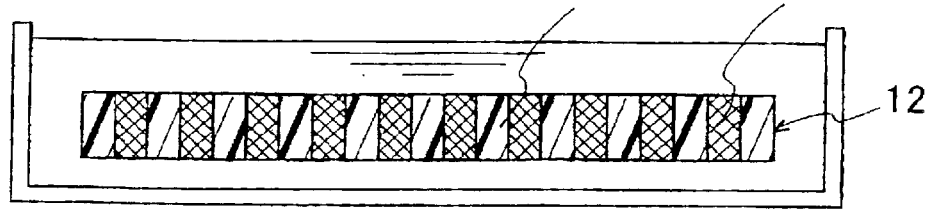
Figure 1:
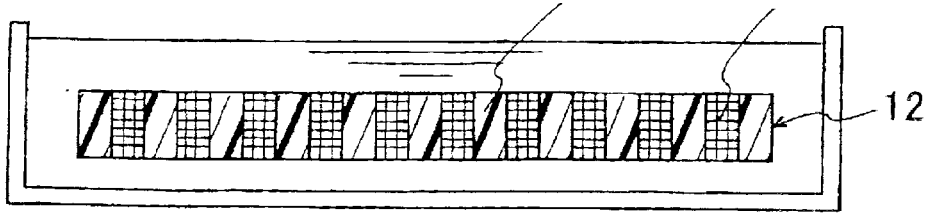
Figure 1:
Figure 2:
FIGS. 2(a) to (f) show the steps of manufacturing the solid polymer electrolyte membrane of Example 2.
Figure 2:
Figure 2:
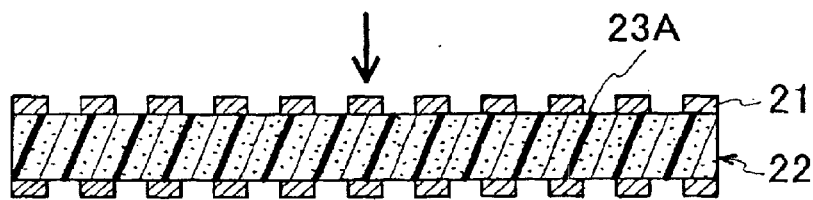
Figure 2:
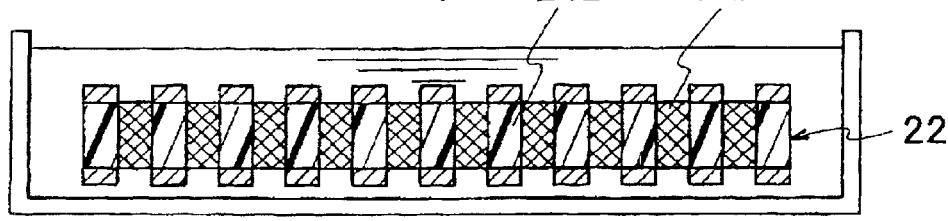
Figure 2:
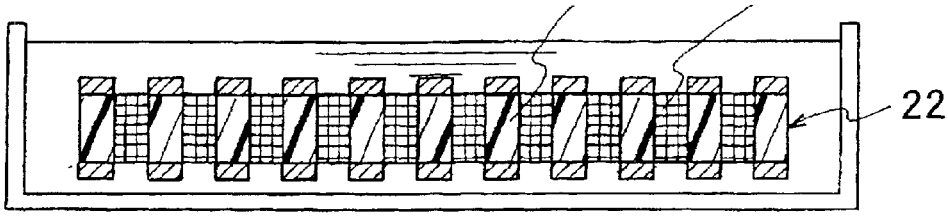
Figure 2:
Figure 3:
FIGS. 3(a) to (g) show the steps of manufacturing the solid polymer electrolyte membrane of Example 3.
Figure 3:
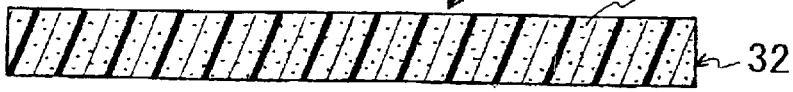
Figure 3:
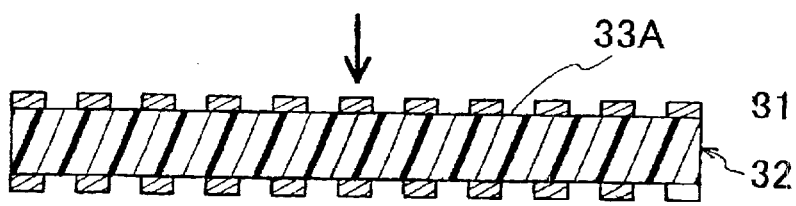
Figure 3:
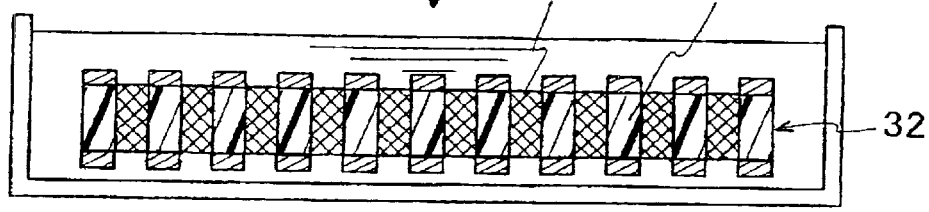
Figure 3:
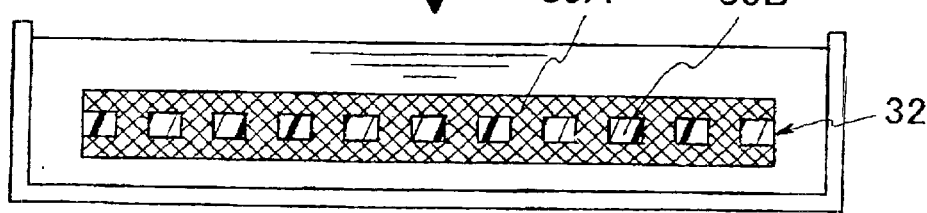
Figure 3:
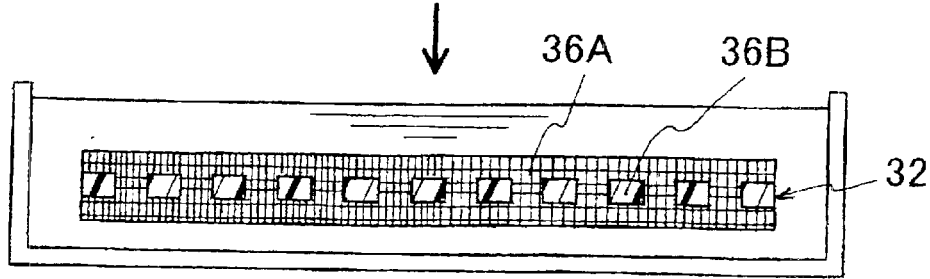
Figure 3:
Figure 4:
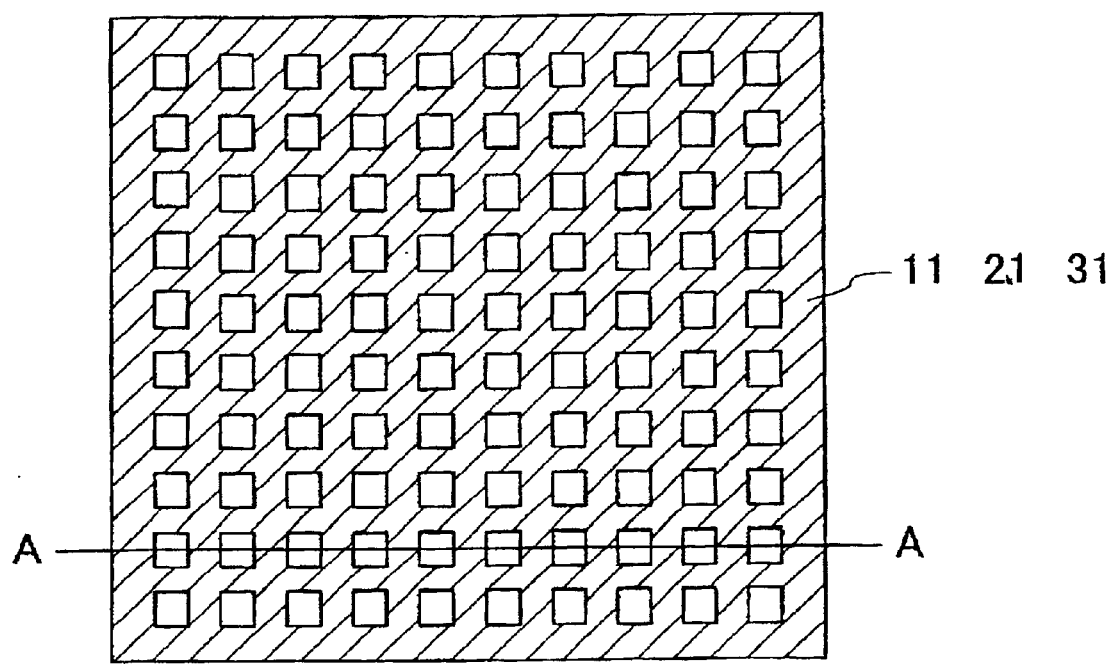
FIG. 4 shows a plane view of masking films employed in Examples 1 to 3.

An example 1 will be described hereinafter with reference with FIGS. 1(a) to (g). A polymer film 12 formed by poly-ethylene-tetrafluoroethylene (polymer substrate) was prepared as shown in FIG. 1(a). The polymer film 12 had a profile of a square with a side length of 200 mm and a thickness of 50 $\mu$. FIG. 4 shows a plane view of a lattice-like masking plate 11 (first mask) and masking films 21 and 31 (second mask) having the same profiles as the polymer film 12. In addition, FIGS. 1, 2 and 3 show cross-sectional views of the masking thin plate 11 and the masking films 21 and 31 taken along the line A—A of FIG. 4, respectively. In Examples 2 and 3, the masking films 21 and 31 have the same profiles as in FIG. 4 but are made from different materials.

<Step 1>

As shown in FIG. 1(b), the upper and lower sides of the polymer film 12 were covered with the pair of masking thin plates 11 as shown in FIG. 1. Each masking thin plate 11 included lead and had plural square holes (0.1 to 20 mm on a side) therein as shown in FIG. 4.

<Step 2>

The polymer film 12, covered with the masking thin plates 11 was applied with 20 kGy of gamma rays in Nitrogen gas ($N_2$) at room temperature. Because of the masking thin plates 11, the polymer film 12 was sectioned into radiated portions 13A which were radiated with the gamma rays through the square holes in the masking thin plate 11 and non-radiated portions 13B which were shielded by the mask 11 and not radiated with the gamma rays as shown in FIG. 1(c).

<Step 3>

The masking thin plates 11 were removed from the upper and lower sides of the polymer film 12 as shown in FIG. 1(d).

<Step 4>

The polymer film 12 including the radiated portions 13A and the non-radiated portions 13B was soaked in a mixed solution including a styrene monomer, a divinyl benzene, and a xylene, 95: 5: 30 in a volume ratio of the mixed solution at 60° C. for two hours. Therefore, styrene side-chains included in the mixed solution were grafted onto the ethylene tetrafluoroethylene polymers in the radiated portions 13A which were already formed at Step 2. On the other hand, the non-radiated portions 13B were not grafted with styrene side-chains. By the above radiation graft polymerization, the radiated portions 13A and the non-radiated portions 13B were changed into graft-polymerized portions 14A and non-graft-polymerized portions 14B, respectively, in the polymer film 12.

After Step 4, the resulting polymer film 12 including the graft-polymerized portions 14A and the non-graft-polymerized portions 14B was dried at 70° C. The dried polymer film 12 was soaked in a mixed solution including a chlorosulphonic acid and a 2-dichloroethane, 30: 100 in a volume ratio at 50° C. for an hour. Therefore the non-masked portion was sulfonated. On the other hand, the non-graft-polymerized portion 14A was not sulfonated. By the above sulfonation, the graft-polymerized portions 14A and the non-graft-polymerized portions 14B were changed into sulfonated portions 15A and non-sulfonated portions 15B, respectively, in the polymer film 12.

Then the resulting polymer film 12 including the sulfonated portions 15A and the non-sulfonated portions 15B was soaked in deionized water at 90° C. for an hour. The polymer film 12 was further cleaned with more deionized water for two hours.

In Example 1, the non-masked portions in the polymer film 12 were sulfonated, but the masked portions, which the masking thin plate 11 had shielded from the gamma rays, were not sulfonated. Thus the masked-portions remained original polymers through the method described above. The schematic cross sectional view of the above polymer film 12 is shown in FIG. 1(g). The properties of the above partially sulfonated polymer film 12 are shown in Table 1.

TABLE 1

Properties and Cell Output Voltages of Solid Electrolyte Membranes

|  | Tensile Strength (Mpa) JIS K7127 | Tensile Fracture (%) JIS K7127 | Cell Output Voltage (V/0.2A-cm$^{-2}$) |
|---|---|---|---|
| Example 1 | 57.1 | 330 | 0.734 |
| Example 2 | 55.9 | 327 | 0.731 |
| Example 3 | 51.8 | 310 | 0.739 |
| Reference Sample | 40.1 | 126 | 0.741 |
| Polymer Substrate (ETFE) | 63.1 | 404 | — |

Figure 5:
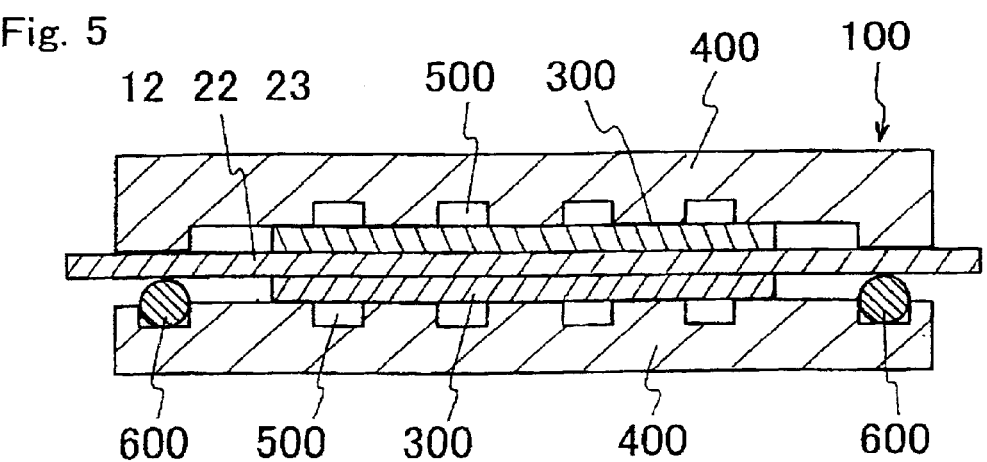
FIG. 5 is a schematic cross sectional view of the solid polymer electrolyte membrane fuel cell having the solid polymer electrolyte membrane.

As shown in FIG. 5, the electrodes 300 were connected with both sides of the resulting polymer film 12 as the solid electrolyte membrane by hot pressing at 160° C. applied 80 kgf/cm$^2$ for 60 seconds. The solid electrolyte membrane polymer 12) with the electrodes 300 was sandwiched between separators 4 with O-ring 600, and the solid electrolyte membrane fuel cell 1100 was therefore manufactured. The separators 4 had grooves 500 on those surfaces contacting the electrodes 300. The grooves 500 were formed to supply the fuel gas or oxidizer gas to the electrodes 300. Then the power characteristics of the above solid electrolyte membrane fuel cell 100 were evaluated with hydrogen gas (H$_2$) employed as the fuel gas and air employed as the oxidizer gas under atmospheric pressure at a cell temperature of 75° C. The results are shown in Table 1.

EXAMPLE 2

Example 2 will be described hereinafter with reference to FIGS. 2(a) to (f). A polymer film 22 formed by polyethylene tetrafuloroethylene was prepared as the polymer substrate, as shown in FIG. 2(a). The polymer film 22 had the profile of a square with a side length of 200 mm and a thickness of 50 μm.

<Step 1>

As shown in FIG. 2(b), the polymer film 22 was applied with 20 kGy of gamma rays in N$_2$ gas at room temperature. Because of the radiation, a radiated portion 23A was formed in the polymer film 22.

<Step 2>

The resulting polymer film 22 was covered with masking films 21 at upper and lower sides thereof as shown in FIG. 2(c). The masking films 21 had the same profile as the masking thin plate 11 in Example 1. But the masking films 21 were formed by a film insoluble and impermeable to solutions employed at Steps 3 and 4, for example a Teflon adhesive sheet ("Teflon" is a trademark of duPont for polytetrafluoroethylene) was applied.

<Step 3>

The polymer film 22 with the masking films 21 was soaked in a mixed solution including a styrene monomer, a divinyl benzene and a xylene, 95: 5 : 30 in the volume ratio of the mixed solution at 60° C. for two hours. The styrene side-chains were thereby grafted onto the ethylene tetrafluoroethylene polymers in the radiated portion 23A. By the above graft-polymerization, graft-polymerized portions 24A and non-graft-polymerized portions 24B were formed in the polymer film 22 as shown in FIG. 2(d).

<Step 4>

After bring dried, the polymer film 22 including the graft-polymerized portions 24A and the non-graft-polymerized portions 24B was soaked in a mixed solution including the chlorosulphonic acid and the 2-dichloroethane, 30 :100 in the volume ratio at 50° C. for an hour.

Next, the polymer film 22 having the graft-polymerized portions 24A and the non-graft-polymerized portions 24B was soaked in deionized water at 90° C. for an hour (not shown in FIG. 2). The polymer film 22 was further cleaned by additional deionized water for two hours.

In Example 2, the portions not covered with the masking film 21 were sulfonated. But the remaining portions covered with the masking film 21 were not sulfonated and remained original polymers through the method described above. The schematic cross sectional view of the above polymer film 22 is shown in FIG. 2(f).

The properties of the above partially sulfonated polymer film 22 are also shown in Table 1.

The solid polymer electrolyte membrane manufactured in Example 2 was connected with electrodes 300 in the same fashion as Example 1, and then the output voltage of the fuel cell applied with the polymer film 22 (the solid polymer electrolyte membrane) was measured in the same way as in Example 1. The cell output voltage under an electric current density 0.2 mA/cm$^2$ is also shown in Table 1.

EXAMPLE 3

Example 3 will be described hereinafter with reference to FIGS. 3(a) to (g). A polymer film 32 formed by polyethyrene tetrafluoroethylene was prepared as the polymer substrate shown in FIG. 3(a). The polymer film 32 had a profile of a square with a side length of 200-mm and a thickness of 50 μm.

<Step 1>

As shown in FIG. 3(b), the polymer film 32 was applied with 20 kGy of gamma rays in N$_2$ gas at room temperature. Because of the radiation, a radiated portion 33A was formed in the entire polymer film 32.

<Step 2>

The resulting polymer film 32 was covered with masking films 31 at upper and lower sides thereof as shown in FIG. 3(c). The masking films 31 had the same profile as the masking thin plate 11 in Example 1. But the masking films 31 were formed by a film insoluble and impermeable to solutions employed at Steps 3, 4 and 5, for example, a Teflon adhesive sheet was employed.

<Step 3>

The polymer film 32 with the masking films 31 were soaked in the mixed solution including a styrene monomer, a divinyl benzene, and a xylene, 95: 5 : 30 in the volume ratio of the mixed solution at 60° C. for two hours. The styrene side-chains were thus grafted onto the ethylene tetrafluoroethylene polymers in the radiated portion 33A. By the above graft-polymerization, graft-polymerized portions 34A and non-graft-polymerized portions 34B were formed in the polymer film 32 as shown in FIG. 3(d). The polymer film 32 was processed as in Example 2.

<Step 4>

The masking films 31 were removed from the upper and lower sides of the polymer film 32 as shown in FIG. 3(e).

<Step 5>

The polymer film 32 was soaked in the mixed solution including the styrene monomer, the divinyl benzene, and the xylene, 95 : 5: 30 in the volume ratio of the mixed solution at 60° C. for ten minutes again as shown in FIG. 3(e). The styrene side-chains were grafted onto the polymers in surface layers (upper and lower portions in thickness direction in FIG. 3(e)) of the non-graft-polymerized portions 34B in the radiated portion 33A. Then the full-grafted portions 35A and the superficial-grafted portions 35B were formed in the polymer film 32 as shown in the Figures.

Then polymer film 32 was soaked in the mixed solution including chlorosulphonic acid and 2-dichloroethane, 30: 100 in the volume ratio at 50° C. for an hour as shown in FIG. 3(f). Thus the surface layers formed at both sides of the polymer film 32 was partially sulfonated, but the inside portion of the polymer film 32 remained original polymers through the method described above. Therefore, superficial-sulfonated portion 36A and non-sulfonated portion 36B were formed in the polymer film 32 as shown in FIG. 3(f).

After being dried, the polymer film 32 was soaked in deionized water for an hour. Then the soaked polymer film 32 was further cleaned by the additional deionized water for two hours.

By the above method, the surface layer of the polymer film 32 was partially sulfonated but the remaining inside portion of the polymer film 32 remained the original polymer. The schematic cross sectional view of the polymer film 32 is shown in FIG. 3(g).

The properties of the above partially sulfonated polymer film 32 are also shown in Table 1.

The resulting polymer film 32 of the Example 3 was connected with testing electrodes, then the output voltage of the fuel cell applied with the above solid polymer electrolyte membrane, was measured in the same conditions as Example 1. The cell output voltage under an electric current density 0.2 mA/cm$^2$ is shown in Table 1.

COMPARATIVE EXAMPLE

A polymer film having a profile with a side length of 200 mm and a thickness of 50 μm was prepared. The polymer film was applied with 20 kGy of gamma rays in N$_2$ gas at normal temperature. Then the radiated polymer film was soaked in a mixed solution including a styrene monomer, a divinyl benzene, and a xylene, 95 : 5 : 30 in the volume ratio of the mixed solution at 60° C. for two hours. Thus styrene side-chains were grafted on to ethylene tetrafluoroethylene polymers in the radiated portion 23A. After being dried, the graft-polymerized polymer film was soaked in a mixed solution including chlorosulphonic acid and 2-dichloroethane, 30: 100 in a volume ratio at 50° C. for an hour. After being dried, the polymer film was soaked in deionized water at 90° C. for an hour. The polymer film was further cleaned by the additional deionized water at 90° C. for two hours. Therefore, the polymer film of the comparative example was obtained.

The properties of the resulting polymer film are also shown in Table 1.

The resulting polymer film of the Comparative example was connected with testing electrodes, then the output voltage of the fuel cell applied with the above solid polymer electrolyte membrane was measured in the same conditions as in Example 1. The cell output voltage under an electric current density 0.2 mA/cm$^2$ is shown in Table 1.

As shown in Table 1, each of the polymer films 12, 22 and 32 had a higher tensile strength and a larger fracture compared to a polymer film of the comparative example. Furthermore, the fuel cells applied with the polymer films had higher cell output voltage compared to that applied with the polymer film of the comparative example.

What is claimed is:

1. A method for producing a solid polymer electrolyte membrane with ion exchangeability employed in a solid polymer electrolyte fuel cell, comprising a step of combining an anion group with a solid polymer membrane over a part of the surface of said membrane, which part is less than an entire surface of said membrane, wherein the solid polymer electrolyte membrane includes anion group combined regions and non-anion group combined regions, and wherein the method further comprises steps of covering a portion of the solid polymer membrane with a mask; and applying radiation to the solid polymer membrane.

2. A method for producing a solid polymer electrolyte membrane comprising the steps of:

covering a portion on a surface of a polymer substrate with a first mask to shield the portion;

applying radiation to an entirety of the polymer substrate;

grafting a styrene onto a polymer in a remaining portion in the polymer substrate not covered by the first mask;

removing the first mask from the polymer substrate; and combining an anion group with the styrene on the polymer in the grafted remaining portion of the polymer substrate.

3. A method for producing a solid polymer electrolyte membrane comprising the steps of:

applying radiation to a surface of a polymer substrate;

covering a portion in the radiated surface of the polymer substrate with a mask to shield the portion;

grafting a styrene onto a polymer in a remaining portion of the polymer substrate not covered with the mask; and combining an anion group with the styrene on the polymer in the grafted remaining portion of the polymer substrate.

4. A method for producing a solid polymer electrolyte membrane comprising the steps of:

applying radiation to a surface of a polymer substrate;

covering a portion of the radiated surface of the polymer substrate with a mask for shielding the portion;

grafting a styrene onto a polymer in a remaining portion in the polymer substrate not covered with the mask;

removing the mask from the polymer substrate; and combining an anion group with the styrene on the polymer of a surface portion of the portion in the thickness direction thereof.

5. The method for producing the solid polymer electrolyte membrane in accordance with claim 1, wherein the anion group includes a sulfonic acid group.

6. The method for producing the solid polymer electrolyte membrane in accordance with claim 2, wherein the anion group includes a sulfonic acid group.

7. The method for producing the solid polymer electrolyte membrane in accordance with claim 3, wherein the anion group includes a sulfonic acid group.

8. The method for producing the solid polymer electrolyte membrane in accordance with claim 4, wherein the anion group includes a sulfonic acid group.

9. The method for producing a solid polymer electrolyte membrane with ion exchangeability employed in a solid polymer electrolyte fuel cell in accordance with claim 1, wherein said solid polymer electrolyte membrane includes sulfonated regions and non-sulfonated regions.

10. The method for producing a solid polymer electrolyte membrane with ion exchangeability employed in a solid polymer electrolyte fuel cell in accordance with claim 2, wherein the first mask includes lead.

11. The method for producing a solid polymer electrolyte membrane with ion exchangeability employed in a solid polymer electrolyte fuel cell in accordance with claim 3, wherein the mask is formed with polytetrafluoroethylene.

12. The method for producing a solid polymer electrolyte membrane with ion exchangeability employed in a solid polymer electrolyte fuel cell in accordance with claim 4, wherein the mask is formed with polytetrafluoroethylene.

* * * * *